M. GOHLKE.
BALL BEARING.
APPLICATION FILED APR. 26, 1912.

1,105,268.

Patented July 28, 1914.

UNITED STATES PATENT OFFICE.

MAX GOHLKE, OF PANKOW, NEAR BERLIN, GERMANY.

BALL-BEARING.

1,105,268.  Specification of Letters Patent.  Patented July 28, 1914.

Application filed April 26, 1912. Serial No. 693,342.

*To all whom it may concern:*

Be it known that I, MAX GOHLKE, engineer, a subject of the King of Prussia, residing at No. 5/6 Florastrasse, Pankow, near Berlin, Germany, have invented certain new and useful Improvements in Ball-Bearings; and I do hereby declare the following to be a full, clear, and exact description of the invention, such as will enable others skilled in the art to which it appertains to make and use the same.

This invention relates to a ball bearing of the kind in which all the parts of the bearing are arranged in a bush which is fixed in a frame socket.

The present invention consists in an improved method of fixing the bush in the frame socket which affords a secure hold for the bush and for the fixing member itself and which permits of readily and easily loosening.

In accordance with the invention the hub bush is held in the socket by means of a split ring, the clamping action of which is regulated by means of a set screw with a conical head while simultaneously the pressure of the split ring secures this set screw.

Figure 1:
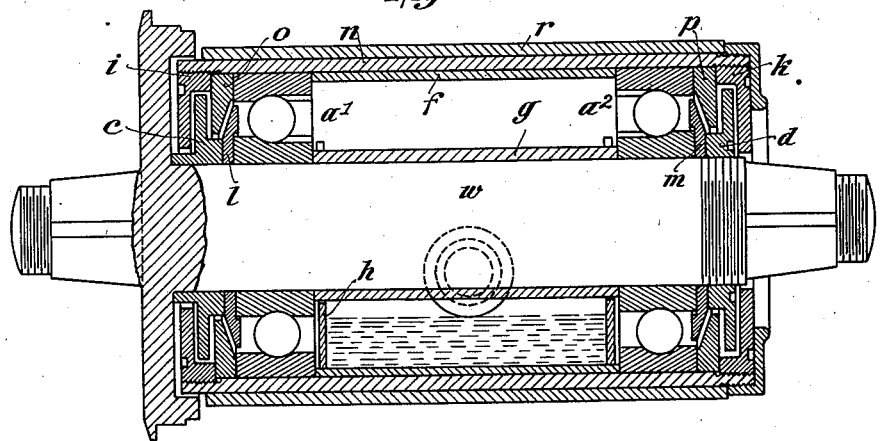
Figure 2:
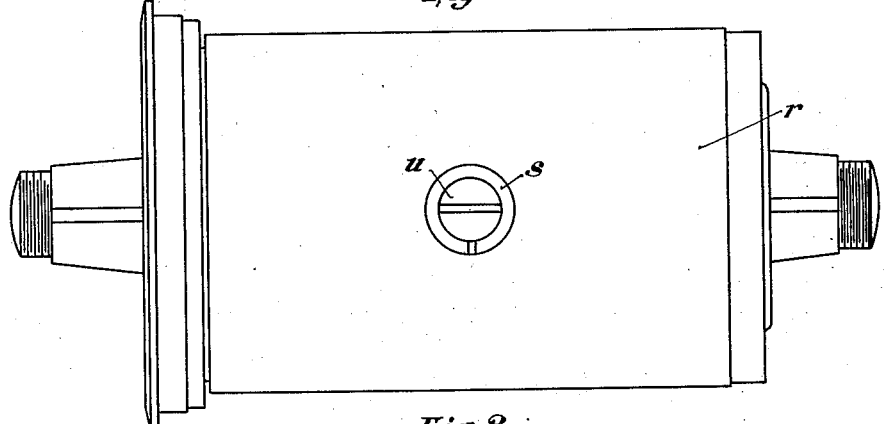
Figure 3:
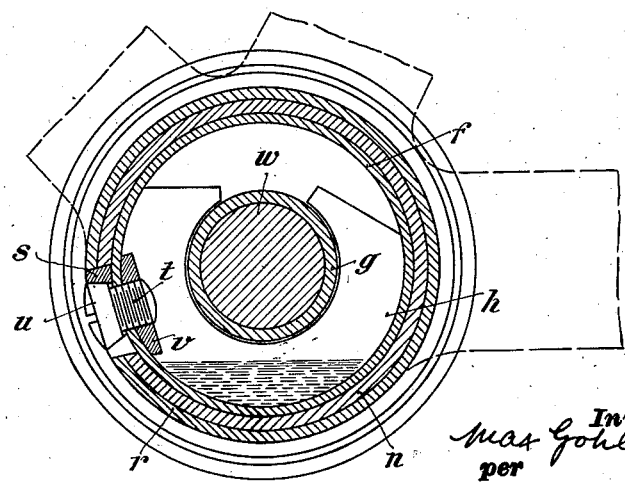

The novel method of fixing is illustrated as applied to the bottom bracket of a velocipede in the accompanying drawing, in which:

Figure 1 shows the bearing as a whole in longitudinal section. Fig. 2 is an elevation thereof, and Fig. 3 is a vertical cross section.

As regards the general arrangement of the bearing illustrated two normal ball bearings $a'$ $a^2$ are arranged inside the hub bush their outer and inner ball races being held at the proper distance apart in the bush by the intermediate sleeves $f$ $g$ which are supplemented by a partition $h$ so as to form an oil trough. The inner ball race rings and the intermediate sleeve $g$ are pressed together by the inner clamping disks $c$ and $d$, the latter of which is screwed onto the crank shaft $w$ while the outer ball rings of the bearing, including the outer intermediate sleeve $f$, are held by the outer clamping disks $i$ $k$ which are screwed into the hub bush on either side. In order to make the bearing oil and dust-tight, the adjacent inner and outer clamping disks $c$ $i$ and $d$ $k$ respectively overlap each other and between the disks and the corresponding ball race ring intermediate disk $l$ $o$ and $m$ $p$ respectively are arranged; they overlap each other and together with the other disks constitute a labyrinth packing.

For the purpose of securing the bearing the bush $n$ and the frame socket $r$ are provided at the middle with corresponding perforations in which when the bush is inserted in the sleeve, the split ring $s$ is arranged, its clamping action fixing the bush and socket so that they are unable to rotate or shift relatively to each other. In order to obtain this spring or clamping action a pin $t$ with conical head $u$ is inserted in the split ring; it is screwed into the outer intermediate sleeve $f$ where it is provided with a reinforcement $v$. The pin or screw $t$ is screwed in to such an extent that its conical head $u$ spreads the split ring while the pin or screw itself is secured from unintentional loosening by the re-action of the ring.

The bearing is assembled in the following manner: The hub bush is inserted in the frame socket until the perforations register, whereupon the split ring is inserted and the pin or screw introduced through the split ring. Now if the pin is screwed into the thread provided in the intermediate sleeve $f$ its conical head $u$ spreads the ring $s$ so that it is no longer possible for the bush $n$ to shift in the socket $r$ but these parts are completely secured from loosening by shocks or vibration. As the spilt ring clamps the conical head of the pin or screw the latter is also secured from unintentional loosening.

What I claim and desire to secure by Letters Patent of the United States is:—

In a bicycle bearing, the combination of inner and outer concentric ball race rings, a distance sleeve between said outer ball race rings adapted to hold said ball race rings apart, a bushing surrounding said distance sleeve and said ball race rings, a frame socket adapted to receive said bushing, corresponding cylindrical perforations in said frame socket and said bushing, a pin screwed into said distance sleeve through said perforations and having a conical head, and a split ring having a cylindrical outer face and a conical inner face and adapted to be inserted in said perforations and to be pressed by said conical head of said pin against the cylindrical walls of said perforations.

In testimony whereof, I have affixed my signature, in presence of two witnesses.

MAX GOHLKE.

Witnesses:
  HENRY HASPER,
  WOLDEMAR HAUPT.